United States Patent [19]
Fujieda et al.

[11] Patent Number: 5,441,393
[45] Date of Patent: Aug. 15, 1995

[54] UPPER AND LOWER RIMS OF POST-CURE TIRE INFLATOR, AND UPPER AND LOWER RIM REPLACING APPARATUS

[75] Inventors: Yasuhiko Fujieda; Hisanori Oshiba, both of Kobe, Japan

[73] Assignee: Kabushiki Kaisha Kobe Seiko Sho, Kobe, Japan

[21] Appl. No.: 257,439

[22] Filed: Jun. 8, 1994

Related U.S. Application Data

[62] Division of Ser. No. 976,388, Nov. 13, 1992, abandoned.

[30] Foreign Application Priority Data

Nov. 13, 1991 [JP] Japan .................................. 3-326468

[51] Int. Cl.$^6$ ............................................. B29C 35/16
[52] U.S. Cl. ..................... 425/58.1; 425/36; 425/38
[58] Field of Search ............... 425/36, 38, 58.1, 185, 425/186, 193

[56] References Cited

U.S. PATENT DOCUMENTS

| | | | |
|---|---|---|---|
| 3,195,179 | 7/1965 | Laube | 425/58.1 |
| 3,809,423 | 5/1974 | Gazuit | 425/38 |
| 4,169,698 | 10/1979 | Turk et al. | 425/58.1 |
| 4,449,903 | 5/1984 | Hasegawa et al. | 425/38 |
| 4,614,485 | 9/1986 | Sakaguchi et al. | 425/38 |
| 5,344,295 | 9/1994 | Watanabe et al. | 425/58.1 |

*Primary Examiner*—C. Scott Bushey
*Attorney, Agent, or Firm*—Oblon, Spivak, McClelland, Maier & Neustadt

[57] ABSTRACT

Separable upper and lower rims of a post-cure tire inflator requiring no upper rim replacing operation which requires much time and labor especially when mounting the upper rim, and also no time and labor for holding a lower rim upward when mounting. In the upper and lower rim for holding the bead section of the tire, a high-pressure air is filled in a cured tire discharged from a tire curing press to thereby inflate and cool the tire; therefore at least the upper rim has stairway-like steps having two or more outer diameters fit to the bead diameters of tires of different sizes and formed by extending a small outer diameter on a large outer diameter.

4 Claims, 6 Drawing Sheets

UPPER AND LOWER RIMS OF POST-CURE TIRE INFLATOR, AND UPPER AND LOWER RIM REPLACING APPARATUS

This is a Division of application Ser. No. 07/976,388, filed on Nov. 13, 1992, now abandoned.

BACKGROUND OF THE INVENTION

1. Field of the Invention

The present invention relates to a post-cure inflator for inflating and cooling a cured tire by filling a high-pressure air into the cured tire and, more particularly, to separable upper and lower rims for holding the bead section of the cured tire and an upper and lower rim replacement apparatus.

2. Description of the Related Art

As a prior post-cure inflator, there has been in wide use a turnover-type post-cure inflator having two sets of upper and lower rims for holding a tire per cavity of a tire curing press, and designed to operate for tire expansion and cooling for at least one cycle time of the tire curing press and to turn over these upper and lower rims. Referring to FIG. 6, the upper and lower rims for holding a tire in such a post-cure inflator will be explained. An upper rim 11 and a lower rim 12 are separable disc-shaped rims and are made in a stepped form with their outer diameters 11a and 12a protruding to the size of bead diameter in order to hold the bead section B of the tire T, thus fixing and holding the bead section B of the tire T. Subsequently, the high-pressure air is filled in the tire, which therefore will be inflated by means of a pump not illustrated. Then the tire is turned over together with the upper and lower rims, being held in this state for a period of time over the one-cycle time of the tire curing press for self-cooling at a room temperature. When tires of different bead diameters are to be handled, therefore, it is necessary to replace the upper and lower rims with those having an outer diameter fit to the bead diameter, for the purpose of holding the tire while keeping its airtightness. It has been a general practice, therefore, to mount the upper and lower rims by bolts to the upper and lower rim supports so that these rims can be manually replaced.

The above-described post-cure inflator, however, has the following disadvantage that especially when the upper rim is to be mounted, a worker tightens bolts, looking at them from below, while holding a heavy upper rim up as high as the upper rim support above the post-cure inflator. This type of work requires several workers and moreover when a particularly large tire is handled in a limited, unstable footing, a large and heavy rim is required, resulting in lower work efficiency. Furthermore, since the lower rim of the post-cure inflator, after replacement, is mounted in a position which is as high as a worker's breast, raising a heavy lower rim to the level is a very hard work.

SUMMARY OF THE INVENTION

In view of the above-described various disadvantages inherent in the heretofore known techniques, it is an object of the present invention to provide upper and lower rims of a post-cure inflator and an upper and lower rim replacing apparatus which dispenses especially with upper rim replacement which requires much labor for mounting and especially with lower rim raising work when mounting the lower rim.

The above-mentioned object of the present invention is accomplished by providing the separable upper and lower rims of the post-cure inflator which are designed to hold the bead section of the tire for the purpose of filling a high-pressure air into a cured tire discharged from the tire curing press to inflate and cool the cured tire, and by providing a stairway-like stepped section having two or more outer diameters to which at least the upper rim fits the bead diameters of tires of different sizes and having a small outer diameter protruding upon a large outer diameter.

Furthermore, the above-mentioned object of the present invention is accomplished by providing the upper and lower rim replacing apparatus of the post-cure inflator, which is an unloader for suspending the tire by the chuck for holding the inside of the bead section of the cured tire which is swingably mounted between the center of the tire curing press and the center of the post-cure tire inflator for inflating and cooling the cured tire by filling the high-pressure air in the cured tire. A lower rim holding section is projectingly provided at the forward end of the chuck of the unloader; a stop station is disposed on the way of swing of the unloader; and a vertically movable rim base is set for mounting at least the lower rim in this stop station.

At least the upper rim is provided with stairway-like steps having two or more outer diameters which fit to the bead diameters of tires of different sizes, so that this upper rim alone can hold tires of various sizes, thus requiring no work to replace the upper rim in accordance a change in the tire size. Further, it is possible to automatically raise and carry the lower rim by the unloader to the post-cure tire inflator mounting position by projectingly mounting the lower rim holding section at the forward end of the chuck of the unloader for carrying the cured tire from the tire curing press to the post-cure tire inflator, by providing the stop station on the way of swing of the unloader, and further by providing the vertically movable rim base for mounting at least the lower rim and moving to this stop station.

The foregoing and other objects and advantages of the present invention will become apparent from the following description of one embodiment of the present invention, together with the accompanying drawings.

DESCRIPTION OF THE PREFERRED EMBODIMENT

Hereinafter the embodiment of upper and lower rims of a post-cure tire inflator, and an upper and lower rim replacing apparatus according to the present invention will be explained with reference to the accompanying drawings. First, in FIG. 1, the upper and lower rims of the post-cure inflator of the present invention will be described, and then, in FIGS. 2, and 4, the rim replacing apparatus will be described.

Figure 1:
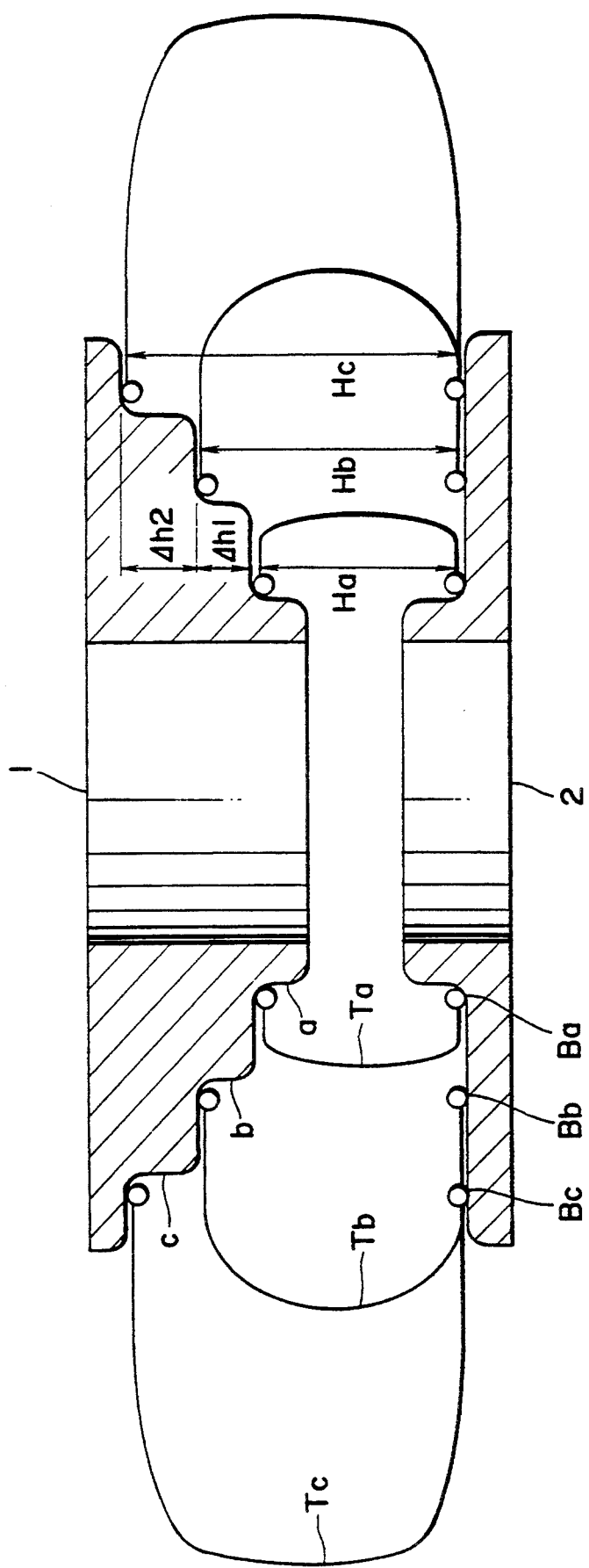
FIG. 1 is a sectional view of upper and lower rims of a post-cure inflator of the present invention.

In FIG. 1, a numeral 1 refers to an upper rim; and a numeral 2 denotes a lower rim. The upper rim 1 has three steps a, b and c, which have bead diameters fit to the bead sections Ba, Bb and Bc of tires Ta, Tb and Tc of different sizes. Also, generally, with an increase in the tire size, the bead diameter also increases, extending outwards; but thickness will not increase so much. Therefore, mean tire thicknesses Ha, Hb and Hc are to be measured to calculate out their differences $\Delta h1$ (=Hb−Ha) and $\Delta h2$ (=Hc−Hb), which will become differences in the height of these differences a, b and c, so that the amount of rim space to be adjusted that has been set by the use of an adjusting screw and a spacer will become extremely little or no adjustment of this rim space will become unnecessary. It should be noted that the present invention is not limited only to the example given above which shows three steps, but the rims having at least two steps may be adopted.

The use of the upper rim 1 and the lower rim 2 described above will require no replacement of the upper and lower rims when the tire size is changed. Further, variation having better airtightness will become usable by providing not only the upper rim but the lower rim with similar stairway-like steps. At this time, the differences $\Delta h1$ and $\Delta h2$ in the height of the steps a, b and c stated above are shared by both the upper and lower rims, and therefore may be a half of the values described above: $\Delta h1/2$ and $\Delta h2/2$.

Furthermore, the airtightness can be improved by replacing, in accordance with a tire size changed, only an easy-to-replace lower rim of proper size with one selected from among several kinds of lower rims that have been prepared in advance. The rim replacing apparatus with the unloader which allows easier replacement of the rims may be used.

Figure 3:
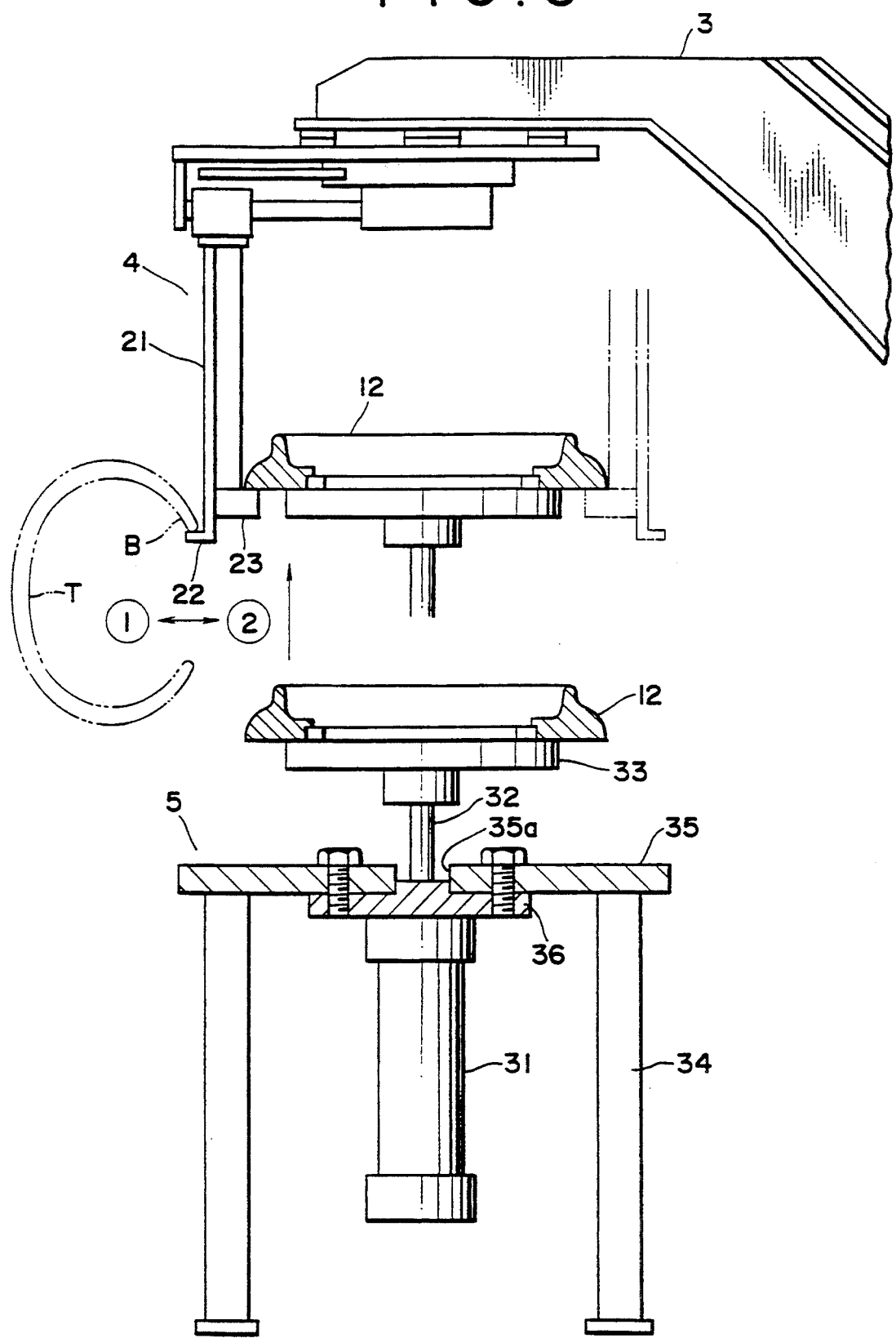
FIG. 3 is a sectional view showing a major portion of a rim base and chuck of the upper and lower rim replacing apparatus.
Figure 4:
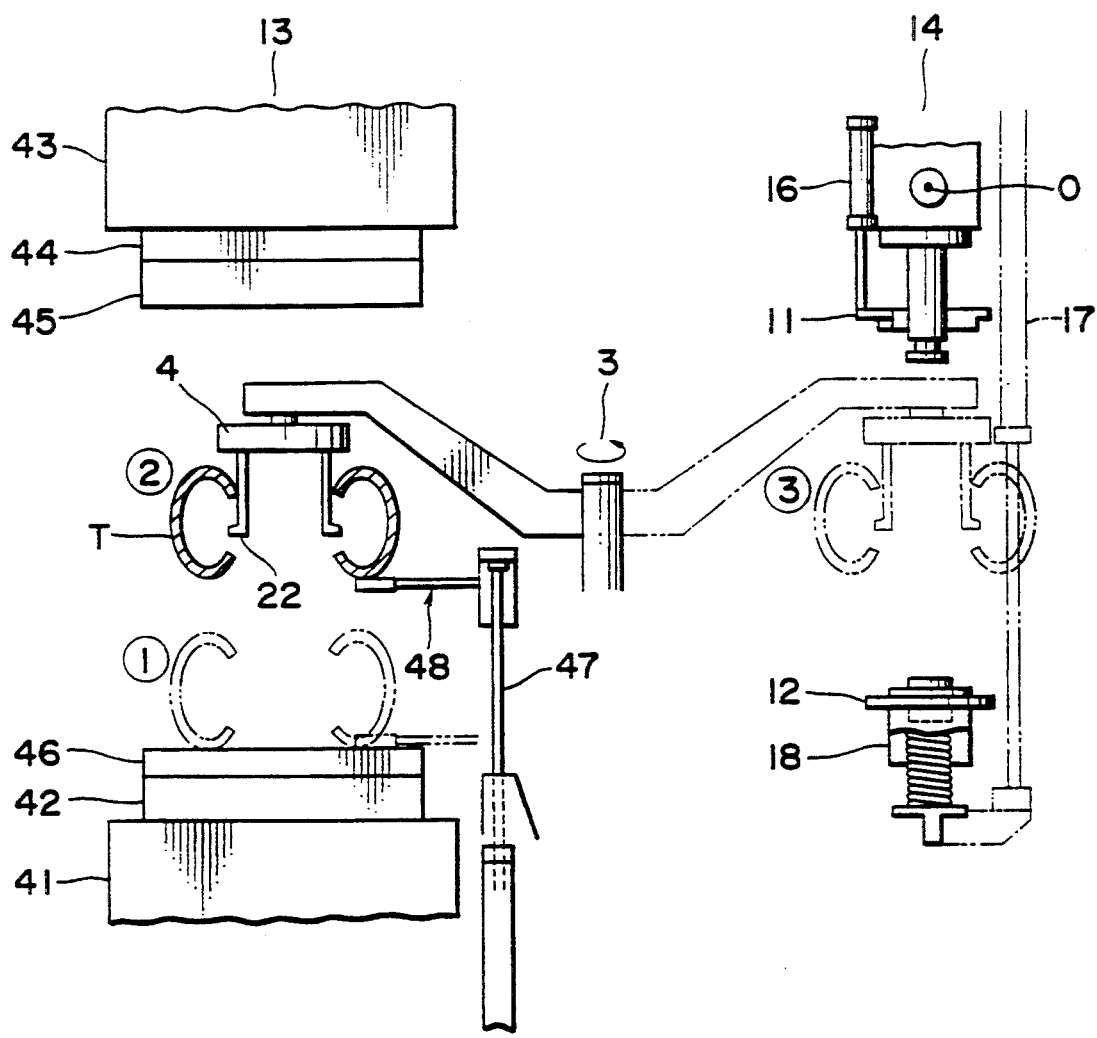
FIG. 4 is a view showing a major portion of the tire curing press, the post-cure inflator, and the unloader, and a view showing the basic state of the unloader in use.

Next, in FIGS. 2, 3 and 4, the rim replacing apparatus of the present invention will be explained. A numeral 3 denotes an unloader; a numeral 4 is a chuck; a numeral 5 refers to a rim base; a numeral 12 represents a lower rim; a numeral 13 expresses a tire curing press; and a numeral 14 refers to a post-cure inflator. The rim replacing apparatus is composed of the unloader 3 having a stop station, a lower rim holding section provided projecting from the chuck 4, and a rim base mounted in the stop station. The tire curing press using the unloader 3 and the post-cure inflator will first be explained, and then each part of the rim replacing apparatus will be explained.

Figure 2:
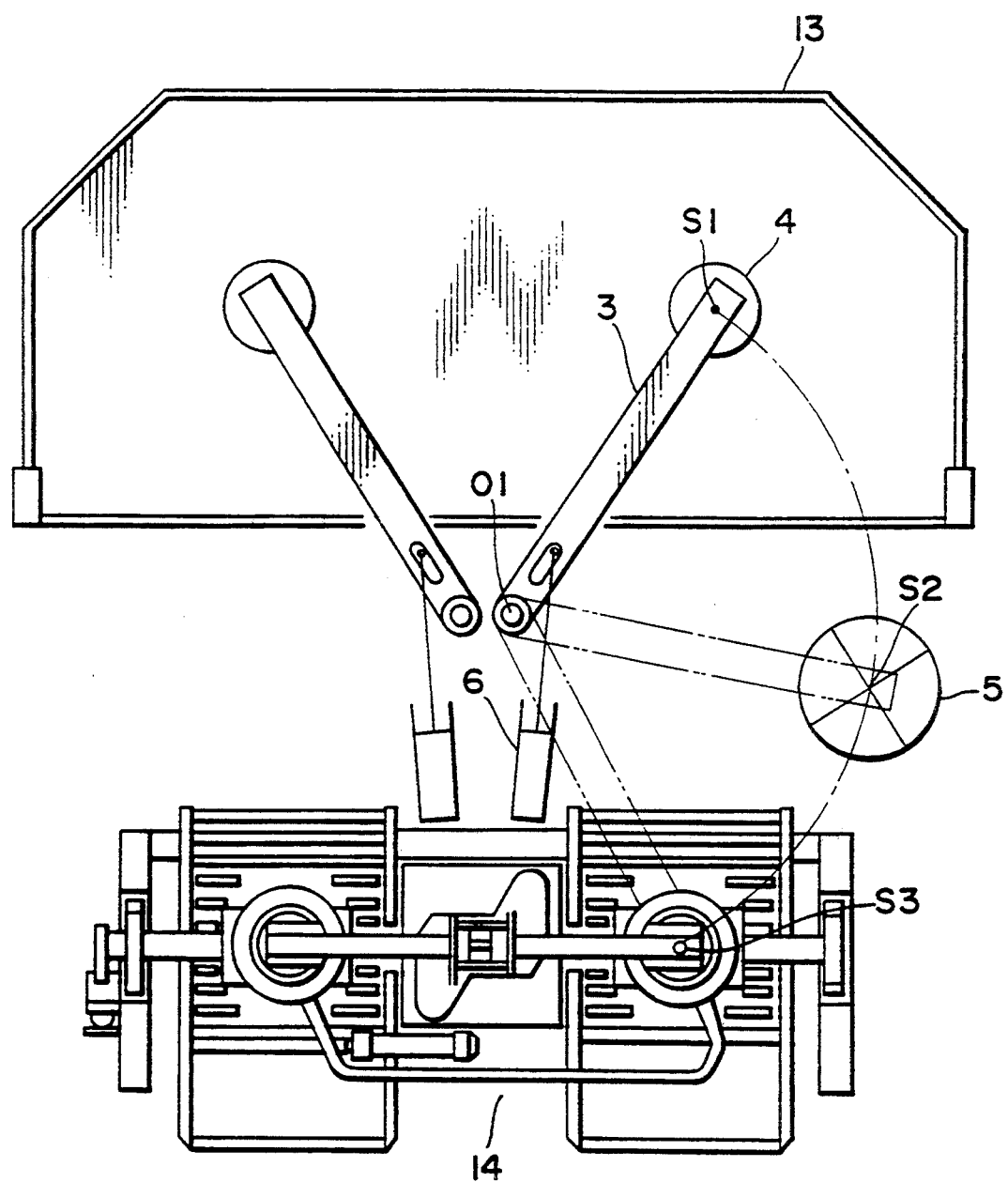
FIG. 2 is a plan view ;showing the arrangement of a tire curing press, the post-cure inflator, and an upper and lower rim replacing apparatus.

FIG. 2 is a plan view showing the arrangement of the tire curing press 13 and the post-cure tire inflator 14 juxtaposed therewith. Between the tire curing press 13 and the post-cure tire inflator 14 is disposed the unloader 3 for unloading the cured tire T from the tire curing press 13 and carrying it to the post-cure tire inflator 14.

The tire curing press is of a twin type, the right and left structures of which are symmetrical so as to perform simultaneous processing of two tires. FIG. 4 is a view showing the basic state of the unloader in use. In FIG. 4, the tire curing press 13 is of such a structure that an upper die 45 and a lower die 46 to be changeably attached by bolts to an upper mold 44 and a lower mold 42 are openably installed between the lower mold 42 installed to the apparatus body through a lower platen 41 or other and the upper mold 44 installed through an upper platen 43. The tire is cured with these upper and lower dies 45 and 46 hermetically closed. On the side face of the tire curing press is juxtaposed a lifting device 47 for lifting the cured tire T, thereby pushing up the tire T as high as a tire T suspending position by the use of the chuck 4 of the unloader 3 as shown in FIG. 4.

The post-cure inflator 14 is of a twin type designed for use with the tire curing press 13. It has two sets of upper and lower rims for holding the tire in one cavity; these rims turn over on the center axis O and therefore it is possible to obtain a longer inflation-cooling time than the one-cycle time of the tire curing press 13. A major part of the post-cure tire inflator 14 is composed of the upper rim 11 and the lower rim 12 mounted to the post-cure inflator body, the upper rim 11 being vertically movable by the lifting cylinder 16 and the lower rim 12 being also vertically movable by the lifting cylinder 17.

Next, the unloader 3 provided with the stop station will be explained. The unloader 3, as shown in FIG. 2, is designed to be swung on the center of swing O1 by means of the swing cylinder 6. This swing cylinder 6 uses for example a two-stage cylinder, by which the unloader 3 can properly stop in three positions: both end positions and an intermediate position. This unloader 3 is designed to stop reliably at the center S1 of the tire curing press, the stop station S2 add the center S3 of the post-cure tire inflator. The rim base 5, therefore, is set with the stop station S2 arranged at center. At the forward end of the unloader is mounted the chuck 4, by which the cured tire is suspended and carried from the center S1 of the tire curing press to the center S3 of the post-cure tire inflator.

Next, the rim base 5 and the lower rim holding section of the chuck 4 will be explained by referring to FIG. 3. The chuck 4 consists of a chuck plate 21, a pawl 22, the lower rim holding section 23 and a driving device, which is not illustrated, for opening and closing the chuck. Furthermore, the rim base 5 is composed of a lifting cylinder 31, a cylinder rod 32, a table 33, an outer frame 34, and an upper plate 35.

The chuck 4 is provided, on its lower end, with three chuck plates 21 arranged at an equal spacing on the circumference and having the pawls 22 circumferentially projecting outward. This chuck 4 is primarily designed to open and close in the directions of the arrows ① and ② to suspend and carry the tire. That is, the chuck 4, when opened in the hooks the direction ①, inside of the bead section B of the tire T and then suspends the tire T. Also the lower rim holding section 23 is projectingly formed on the inside of the lower end of the chuck plate 21, to hold the lower rim 12 from outside and carry the lower rim 12. That is, the chuck 4 is opened in the direction ①, the lower rim 12 is raised until the lower side of the lower rim 12 comes above the lower rim holding section 23, and then the chuck 4 is closed in the direction ②, thus suspending the lower rim 12.

Figure 5:
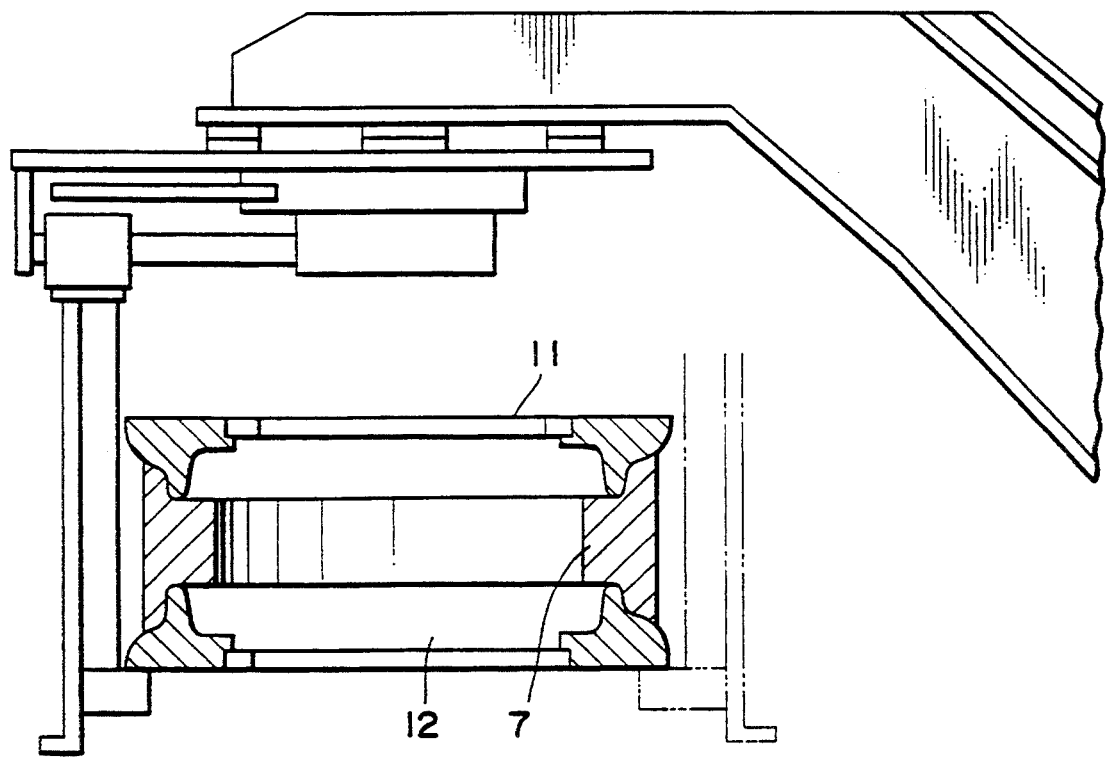
FIG. 5 is a view showing the state of the upper and lower rims being carried by the use the upper and lower rim replacing apparatus of the post-cure inflator of the present invention.
Figure 6:
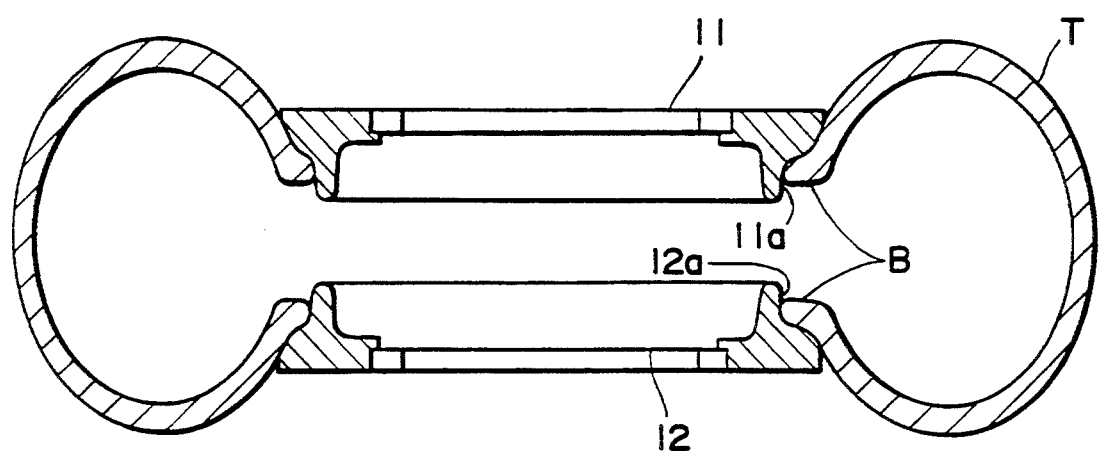
FIG. 6 is a view showing the state of a tire held in prior-art upper and lower rims.

In the rim base 5, the cylinder 31 is fixedly attached by a bracket 36 on the back side of the upper plate 35 such that the cylinder rod 32 may pass through a hole 35a made at the center of the upper plate 35 which is supported by the outer frame 34, and the table 33 mounted on the upper surface of the cylinder rod 32 is moved up and down by means of the lifting cylinder 31. On this table 33 is mounted the lower rim 12, which in turn is raised to a proper position where the lower rim 12 will be held by the chuck 4. Furthermore it is possible to carry both the upper and lower rims by using this device; at this time, as shown in FIG. 5, the upper rim 11 and the lower rim 12 with a spacer 7 inserted are set to carry the rims to the center S3 of the post-cure tire inflator.

Next, the operation of the rim replacing apparatus of the post-cure tire inflator described above will be explained. First, the lower rim 12 is mounted on the table 33 of the rim base 5. At this time, the table 33, being at the knee level, allows easy operation. Subsequently, the unloader 3 is stopped at the stop station S2, where the chuck 4 is opened in the direction ①. Then, the lifting cylinder 31 of the rim base 5 is driven to move the table 33 upward until the lower side of the lower rim 12 comes above the lower rim holding section 23 of the chuck 4. Here, when the chuck 4 is closed in the direction ②, the lower rim 12 is caught and suspended by the chuck 4. Subsequently, the unloader 33 is turned to the center S3 of the post-cure tire inflator by driving the swing cylinder 6. Then, the lifting cylinder 17 shown in FIG. 4 is operated to raise the lower rim support 18 and to set the lower rim 12 thereon. Then, the chuck 4 is opened in the direction ① to release the lower rim 12. Thereafter the lifting cylinder 17 is operated to lower the lower rim 12 and the lower rim support 18, moving the unloader 3 back to the stop station S2. Then the lower rim 12 is fastened by such means as screws to the lower rim support 18. Since the lower rim 12 is on the lower rim support 18, the above-described operation is carried out easily.

Next, referring to FIG. 4, a procedure for carrying the tire from the tire curing press 13 to the post-cure tire inflator 14 which is the primary object of the unloader 3 will be explained. The upper and lower dies 45 and 46 open upward and downward as illustrated after the completion of curing, thus releasing the tire T. Then, the lower side of the tire T in the position ① is pushed up to support the arm section 48 of the lifting device 47, moving this up as high as the position ② to lift the tire by the pawls 22 of the chuck 4. The unloader 3 is rotated to carry the tire to the position ③. Subsequently, the lower rim 12 is moved up as high as the lower side of the tire T by means of the lifting cylinder 17 of the post-cure tire inflator 14 and the tire T is lowered from the chuck 4 to place the tire T on the lower rim 12. The lifting cylinder 17 is operated to move the lower rim 12 down again. The unloader 3 is then swung to move the tire T out of the post-cure tire inflator, and to move the lower rim 12 and the tire T upward. Thus the tire is held between the upper rim 11 and the lower rim 12.

Since at least the upper rim is provided with stairway-like steps having two or more outer diameters which fit to the bead diameters of tires of different sizes, this upper rim alone can hold tires of different sizes in the upper position, thereby dispensing especially with the replacement of the upper rim which will require much time and labor. Furthermore, the lower rim holding section is projectingly provided on the forward end of the chuck of the unloader for carrying the cured tire from the tire curing press to the post-cure tire inflator; the stop station is provided on the way of swing of the unloader; and a vertically movable rim base is set for mounting and moving at least the lower rim to this stop station. The lower rim is automatically raised carried to the location of the post-cure tire inflator by the unloader. It, therefore, becomes possible to automatically carry the lower rim to the post-cure tire inflator simply by adding a slight improvement to an existing unloader and setting the rim base, thereby considerably reducing the time and labor required for lower rim replacement.

What is claimed is:

1. Upper and lower rims of a post-cure tire inflator including an unloader for suspending a cured tire by a chuck swingably disposed between a center of a tire curing press and a center of a post-cure tire inflator for holding said cured tire taken out of said tire curing press and for inflating and cooling said cured tire by filling a high-pressure air into said cured tire and for holding an inside of a bead section of said cured tire; said unloader comprising a lower rim holding section projectingly formed on a forward end of said chuck; a stop station being disposed on the way of swing of said unloader; and a vertically movable rim base set for mounting at least said lower rim on said stop station.

2. Separable upper and lower rims of a post-cure tire inflator for holding a bead section of a cured tire taken out of a tire curing press in order to inflate and cool said cured tire by filling high-pressure air in the cured tire, the inflator including an unloader for suspending a cured tire by a chuck swingably disposed for movement along a path between a center of said tire curing press and a center of said post-cure tire inflator for holding said cured tire taken out of said tire curing press and for inflating and cooling said cured tire by filling high-pressure air into the cured tire and for holding an inside of the bead section of the cured tire, said unloader comprising a lower rim holding section projectingly formed on a forward end of said chuck, a stop station disposed in the path of said unloader, and a vertically movable rim base set for mounting at least said lower rim on said stop station, wherein at least one of said upper and lower rims has at least two outside diameters corresponding to bead diameters of tires of different sizes, and stairway-like steps formed by extending a small-diameter section upon the top of a large-diameter section.

3. The rims of claim 2 wherein only said upper rims has said stairway-like steps.

4. An upper and lower rim replacing apparatus including separable upper and lower rims of a post-cure tire inflator for holding a bead section of a cured tire taken out of a tire curing press in order to inflate and cool said cured tire by filling high-pressure air in the cured tire, the inflator including an unloader for suspending a cured tire by a chuck swingably disposed for movement along a path between a center of said tire curing press and a center of said post-cure tire inflator for holding said cured tire taken out of said tire curing press and for inflating and cooling said cured tire by filling high-pressure air into the cured tire and for holding an inside of the bead section of the cured tire, said unloader comprising a lower rim holding section projectingly formed on a forward end of said chuck, a stop station disposed in the path of said unloader, and a vertically movable rim base set for mounting at least said lower rim of said stop station, wherein at least one of said upper lower rims has at least two outside diameters corresponding to bead diameters of tires of different sizes, and stairway-like steps formed by extending a small-diameter section upon the top of a large-diameter section.

* * * * *

UNITED STATES PATENT AND TRADEMARK OFFICE
CERTIFICATE OF CORRECTION

PATENT NO. : 5,441,393
DATED : August 15, 1995
INVENTOR(S) : Yasuhiko FUJIEDA, et al.

It is certified that error appears in the above-indentified patent and that said Letters Patent is hereby corrected as shown below:

On the title page, Item [75], the second inventor's name should read:

--Hisanori Ohshiba--

Signed and Sealed this

Thirty-first Day of October 1995

Attest:

BRUCE LEHMAN

*Attesting Officer*         *Commissioner of Patents and Trademarks*